Oct. 3, 1950  C. JOHNSON  2,524,446
CONTROL APPARATUS
Filed Aug. 24, 1946

INVENTOR.
CLARENCE JOHNSON
BY
Raymond W. Jenkins
ATTORNEY

Patented Oct. 3, 1950

2,524,446

UNITED STATES PATENT OFFICE 2,524,446

CONTROL APPARATUS

Clarence Johnson, South Euclid, Ohio, assignor to Bailey Meter Company, a corporation of Delaware Application August 24, 1946, Serial No. 692,873

5 Claims. (Cl. 137—157)

My invention relates to pressure responsive control devices, and more particularly to devices which are responsive to fluid pressures for positioning a valve relative to its seat.

In some control devices it is necessary that a control member be moved in a predetermined path relative to another member to effect a controlling action. In the case of a valve mechanism having a valve which is movable relative to a valve seat, the valve must be supported for movement in such a path that the valve seat may be engaged by the valve to effect a complete cutoff in the flow of fluid. The valve mechanism may frequently be provided with a pressure responsive device, such as a diaphragm, for adjusting its position relative to the seat. It has been customary in such cases to oppose the action of the diaphragm by a coil spring surrounding the valve stem and resting upon a stationary abutment. There are, however, a number of objections to the use of a coil spring. In the first place the spring must be of substantial length, making it necessary that considerable space be provided for the valve mechanism. As the coil spring is compressed, it tends to cock in one direction or another and may act on the valve stem to bind the latter in its supporting means or to cause the valve member to be imperfectly seated. There is usually provided a guiding means for the coiled spring, and any cocking of the spring is apt to bring it into engagement with the guiding means and produce friction which interferes with the action of the moving parts. Friction between the valve stem and the casing or between the spring and its guiding means all cause erratic movement of the valve. The space surrounding the valve stem between the ends of the coiled spring is enclosed by the coils so that it is not convenient to locate an adjusting means within this space. The opposite ends of the coil spring are free and are always subjected to the possibility of being displaced from their abutments.

An object of my invention is to provide an improved pressure responsive control device. Another object is to provide improved means for yieldingly supporting a control member in a position to be acted upon by a pressure responsive member. Still another object is to provide a bowed plate type spring adjustably supporting a control member in a position to be acted upon by a pressure actuated diaphragm. Yet another object is to provide an improved pressure responsive valve mechanism including a valve member adjustably connected to a bowed spring in a position to be acted upon by a diaphragm.

In the accompanying drawing in which there is shown for purposes of illustration one form which my invention may assume in practice:

Figure 1:
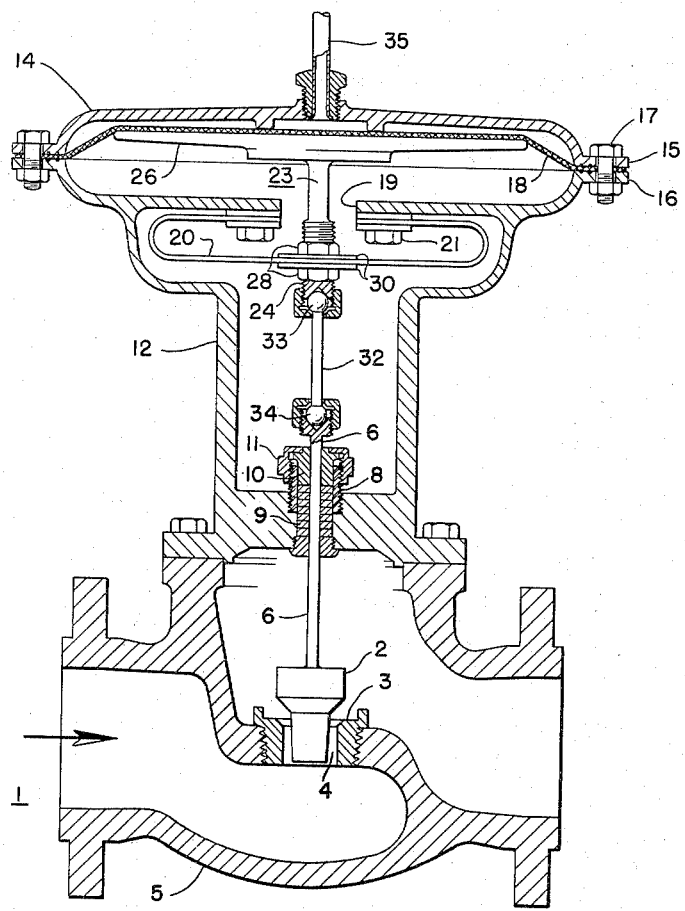
Fig. 1 is a vertical sectional view of a valve mechanism and a control means therefor.
Figure 2:
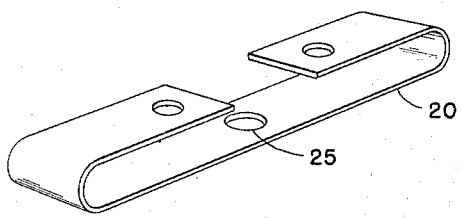
Fig. 2 is a perspective view of the spring shown in Fig. 1.

I have shown in Fig. 1 a valve device, generally designated 1, having a valve member 2 cooperating with a valve seat 3 for controlling the flow of fluid through a port 4 in a valve casing 5. The valve member has a stem 6 extending through an opening in the casing, and surrounding the opening is a recessed boss portion 8 containing a packing 9. Resting upon the packing is a plunger 10, and a cap 11 threadedly engages the boss portion and is adapted to force the plunger against the packing to effect a sealing engagement of the latter with the stem 6.

Supported above the valve casing by any suitable means 12, is a pressure responsive device, generally designated 14, comprising casing members 15 and 16 connected together, as by bolts 17, and clamping between them a diaphragm 18. The casing member 16 is provided at its mid portion with an opening 19, and arranged beneath the member 16 is spring 20 having its end portions bent inwardly and connected by screws 21, as shown, to the casing member at opposite sides of the opening 19. The spring shown herein is made from a piece of flat material but could as well be made from material of other shapes. Arranged beneath the diaphragm is a member 23 having an elongated portion 24 extending through an opening 25 in the center portion of the spring and an enlarged portion 26 engaging the lower side of the diaphragm 18. Threaded upon the portion 24 at opposite sides of the spring are nuts 28 which are adapted to clamp the spring between them so as to hold the member 23 to the spring for movement therewith. By adjusting the nuts along the portion 24, the force at which the member 23 is held by the spring against the diaphrahm may be set at any desired value. The responsiveness of the spring may be varied by clamping backing plates 30 between the nuts 28 and the spring. As the lengths of the backing plates are increased to clamp between them a larger portion of the spring, the responsiveness of the spring decreases and offers a greater opposition to movement of the member 23 by the diaphragm. The member 23 is connected to the valve stem 6, as shown herein, by a rod 32 and ball joints 33 and 34 at opposite ends of the latter.

Communicating with the space above the diaphragm is a conduit 35 through which pressure fluid may be supplied for forcing the diaphragm downwardly against the action of the spring 20. With the arrangement shown, a deflection of the diaphragm causes the valve member 2 to engage the seat 3 and cut off the flow of fluid through the valve casing. If desired, the valve member may cooperate with a valve seat at the lower edge of the port 4 so that the valve is unseated by a deflection of the diaphragm and is urged toward its seat by the spring 20. The valve mechanism is merely illustrative of a device having a control member which is movable in a fixed path. Instead of the valve mechanism there may be used with the pressure responsive device 14 any device having a movable control member.

In the case of the valve mechanism, a force acting on the valve stem out of alignment with its axis may cause a binding of the valve stem, producing friction which causes erratic action of the valve, and if the valve stem should be tilted a slight amount, the valve would not engage the valve seat to cut off effectively the flow of fluid through the port 4. By providing the plate type spring shown and clamping the member 23 to it in axial alignment with the valve 10, the member 23 will be supported for movement at all times in the direction of the stem axis. If the member 23 is supported a slight amount out of alignment with the valve stem, the ball joints 33 and 34 operate to permit the rod 32 to transmit motion of the member 23 to the valve without causing any tilting of the member 23 or any bending of the valve stem.

Because of the shape of the spring shown, the spacing of the pressure responsive device 14 from the valve mechanism is much less than it would be with a coiled spring. The nuts 28 are readily adjusted to vary the action of the spring in holding the member against the diaphragm, and the backing plates 30 may be easily changed to vary the responsiveness of the spring. The member 23 is continuously supported for movement in the direction of its axis, whereas with the coil spring, a tilting may take place on compression of the spring and affect the movement of the control member.

Although there is shown in the drawing a diaphragm responding to the fluid pressure, it will be understood that a piston reciprocably contained in a cylinder, or any other suitable fluid actuated device may act on the member 23, to position the latter and the control member.

While there is shown in this application one form which my invention may assume in practice, it will be understood that this form of the same is shown for purposes of illustration and that it may be modified and embodied in various other forms without departing from its spirit or the scope of the appended claims.

What I claim as new, and desire to secure by Letters Patent of the United States is:

1. A control device comprising, in combination, a control member, a casing containing a fluid actuated member, a bowed spring connected at its opposite ends to said casing, means adjustably connecting said control member to said spring for bodily movement therewith, said spring supporting said control member in a position to be acted upon by said fluid actuated member, and means for supplying pressure fluid to said fluid actuated member.

2. A control device comprising, in combination, a control member, a casing containing a fluid actuated member, a plate type spring having its ends bent inwardly and connected to said casing, means adjustably connecting said control member to the mid portion of said spring for bodily movement therewith, said spring supporting said control member in a position to engage said fluid actuated member, and means for supplying pressure fluid to said fluid actuated member.

3. A control device comprising, in combination, a casing containing a fluid actuated member, a plate type spring having its ends bent inwardly and connected to said casing, a control member extending through an opening in the mid portion of said spring and operatively engaging said fluid actuated member, means for adjustably connecting said control member to said spring, and means for supplying pressure fluid to said fluid actuated member.

4. A control device comprising, in combination, a control member, a casing containing a diaphragm, a bowed spring connected at its opposite ends to said casing, means adjustably connecting said control member to said spring for bodily movement therewith, said spring supporting said control member in a position to be operated upon by said diaphragm, and means for supplying fluid under pressure to one side of said diaphragm.

5. A control device comprising, in combination, a casing containing a diaphragm, a bowed plate type spring connected at its opposite ends to said casing, a control member extending through an opening in said spring and engaging said diaphragm, means for adjustably connecting said control member to said spring, and means for supplying fluid under pressure to one side of said diaphragm.

CLARENCE JOHNSON.

REFERENCES CITED

The following references are of record in the file of this patent:

UNITED STATES PATENTS

| Number | Name | Date |
|---|---|---|
| 19,731 | Burckle | Mar. 23, 1858 |
| 246,348 | Sloane | Aug. 30, 1881 |
| 357,422 | Stabler | Feb. 8, 1887 |
| 1,063,065 | Regondi | Mar. 27, 1913 |